A. SCHMIDT.
FUEL MADE FROM ANTHRACITE COAL REFUSE AND PROCESS OF MAKING SAME.
APPLICATION FILED SEPT. 2, 1909.
1,192,942.  Patented Aug. 1, 1916.
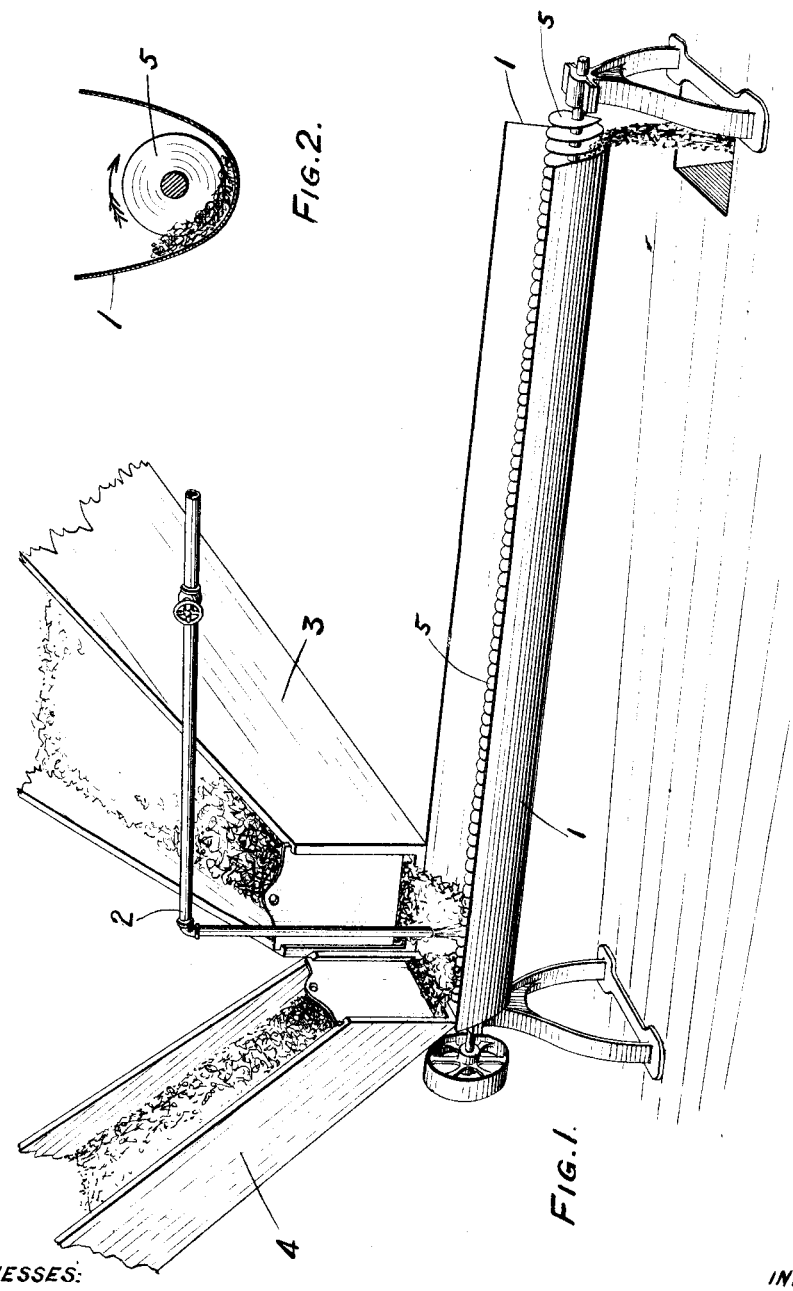
WITNESSES:
INVENTOR
Andrew Schmidt
BY
Augustus B Stoughton
ATTORNEY.

UNITED STATES PATENT OFFICE.

ANDREW SCHMIDT, OF PHILADELPHIA, PENNSYLVANIA.

FUEL MADE FROM ANTHRACITE-COAL REFUSE AND PROCESS OF MAKING SAME.

1,192,942.      Specification of Letters Patent.      Patented Aug. 1, 1916.

Application filed September 2, 1909. Serial No. 515,746.

*To all whom it may concern:*

Be it known that I, ANDREW SCHMIDT, a citizen of the United States, residing at the city of Philadelphia, in the county of Philadelphia and State of Pennsylvania, have invented certain new and useful Fuel Made from Anthracite-Coal Refuse and Process of Making Same, of which the following is a specification.

Objects of the present invention are to utilize the waste of anthracite coal or the refuse from anthracite coal mining including the waste or dust from coke for the production of satisfactory fuel which shall be comparatively inexpensive, capable of withstanding the action of moisture, combustible with the evolution of satisfactory heat and in a satisfactory manner, coherent in combustion and adapted when wet to burn with the evolution of considerable gas; to provide a binder for the material mentioned which shall be comparatively inexpensive, adapted to hold the mass together when wet or exposed to moisture and capable of agglomerating the mass in such a way that the agglomerate stands up or remains practically intact during the combustion of the combustible matter and this even though the agglomerate be wet when fired; to provide comparatively inexpensive fuel manufactured from the materials referred to and which shall be porous, capable of resisting the action of moisture, obtainable in pieces of almost any size, capable of burning satisfactorily with the evolution of appropriate heat, adapted to retain its form after firing and during combustion and having the property, when fired wet, of generating considerable combustible gas; and to provide an expeditious, cheap and commercially satisfactory method of manufacturing such fuel from the materials mentioned.

For the sake of a description of the best way now known to me for practising my invention I will state the proportions and ingredients which have been found to be satisfactory. In 2,240 pounds of the product there are used the following ingredients in the following proportions more or less: anthracite coal waste or refuse of anthracite coal mining, including coal, slate, so called boné, or slaty coal sometimes soapstone and perhaps other ingredients and perhaps without some of the ingredients mentioned, just as it comes, 2,000 pounds; unslaked lime 60 pounds; lamp-black 8 pounds; water 172 pounds, which is the water that goes into the product. More water may be used in the manufacture as will appear from the following description. The refuse or waste is available in the form of lumps or pieces of varying sizes, mostly very small, as is well understood by those familiar with what is known as culm or the waste of anthracite mines. I intend to include in the term anthracite coal waste or refuse not only what that term ordinarily implies but also coke dust or waste and in the case of the last mentioned material three times as much lamp-black must be used as in the example above given.

To prepare the fuel the unslaked lime and lamp-black in powdered form may be mixed in advance and that is the way that I use them although I do not intend to limit myself to using these materials separately. The mixture is introduced into water as is also the waste or refuse. There is considerable water, as a flowing stream, and I will refer to it as a flushing operation. The ingredients are stirred up in the liquid so that the surfaces of the particles of the waste or refuse are wet and a mass of these wet particles is permitted to rest, set and dry. They form a porous agglomerate which can be made of almost any size and may be broken up for use if desired. The mixing process is carried on cold and it might be said with a flushing of water. The setting or drying process commences when the material looks like wet waste or refuse and it continues for several days when the material forms a porous hard agglomerate.

It is difficult to describe just why there is formed in the mixture a cement but at any rate such is the fact and it may be due to the slaking of the lime in the presence of the lamp-black and waste or refuse while flushed with water or the acid character of the refuse or waste may play some part. However, the cementing action gives rise to a porous structure and to a product which will burn without undue crumbling or in fact without any substantial crumbling which will resist the action of moisture and which constitutes a satisfactory fuel capable of being advantageously fired wet. For explanation and not limitation, it may be said that the bulk of the lamp black is relatively considerable, *i. e.*, it is fluffy, and it is well distributed throughout the lime; furthermore the effect of such finely divided or fluffy material is to cause the binder not only to set and set very hard but to resist the disintegrating action of water and moisture.

In the accompanying drawings I have shown apparatus in connection with which I have successfully practised my invention but the latter is not limited to such apparatus although it is the best of which I have knowledge.

In the drawings Figure 1, is a perspective view, and Fig. 2, is a transverse sectional view drawn to an enlarged scale.

1, is an open top trough which may be arranged at a slight inclination.

2, is a pipe for delivering water to the head end of this trough.

3, is a chute for delivering the anthracite coal waste or refuse to the side of the trough at the head end thereof.

4, is a chute for delivering the mixture of slaked lime and lamp-black to the head end of the trough. Within the trough is arranged a rotating spiral 5. It clears the sides of the trough and runs at considerable speed.

In the practice of the process the trough and spiral are well flushed with water and the other ingredients may be introduced dry and are thoroughly mixed together and with the water. In fact the solid materials while traveling through the trough are thrown up to one side thereof while the liquid is more or less carried around with the spiral. At the end of the trough the anthracite coal waste or refuse, or more accurately, the wet particles thereof together with any excess of liquid escape and fall into a pile. The pile is spread out and the material permitted to remain at rest for several days during which it sets into a hard porous mass which can be broken up into pieces of any size or used as it is. If desired the pile of material can be permitted to dry and set in molds or separated masses. The finished material can be handled and delivered like coal since it is not affected by moisture or rain in any way that causes it to soften or deteriorate. It can be fired wet or dry and if fired wet considerable combustible gas is generated. The fire burns for a comparatively long period or keeps in, as it is said, and in the fire the fuel does not break or crumble unduly but sustains whatever burden it has to carry. In fact the lumps of material retain their form while their combustible constituents are consumed.

What I claim is:

1. An improved fuel agglomerate of anthracite coal waste and a calcareous binder set from an excess of water, characterized by the presence of lampblack and by the porous combustion promoting structure of the binder resulting from the action upon the binder as it sets of air included in the lampblack and liberated therefrom while held in suspension by the conjoint action of the coal-waste, excess of water and calcareous binder.

2. An improved agglomerate of anthracite coal waste and a calcareous binder set from an excess of water, characterized by the presence of air bearing dust and by the porous combustion promoting structure of the binder resulting from the action upon the binder as it sets of air included in the air bearing dust and liberated therefrom while held in suspension by the conjoint action of the coal waste, excess of water and calcareous binder.

3. The process of imparting porosity to the calcareous binder of an anthracite coal waste agglomerate, which consists in introducing air throughout the calcareous binder as it sets by incorporating lampblack and its included air into the mixture with an excess of water and allowing the mixture to hold the lampblack in suspension during the setting operation.

4. The process of imparting porosity to the calcareous binder of an anthracite coal-waste agglomerate, which consists in introducing air throughout the calcareous binder as it sets by incorporating air bearing dust and its included air into the mixture with an excess of water and allowing the mixture to hold the air bearing dust in suspension during the setting operation.

ANDREW SCHMIDT.

Witnesses:
K. M. GILLIGAN,
FRANK E. FRENCH.